United States Patent [19]

Trout et al.

[11] Patent Number: 5,439,074
[45] Date of Patent: Aug. 8, 1995

[54] FOLDABLE AND PORTABLE TREE STAND

[76] Inventors: Christopher L. Trout; Karl K. Trout, both of 16 Katherine Ave., Ocean View, N.J. 08230

[21] Appl. No.: 269,012
[22] Filed: Jun. 30, 1994
[51] Int. Cl.⁶ ............................................... A45F 3/26
[52] U.S. Cl. ..................................... 182/187; 108/152
[58] Field of Search ............... 182/187, 188, 135, 136; 108/152

[56] References Cited

U.S. PATENT DOCUMENTS

| | | | |
|---|---|---|---|
| 4,009,763 | 3/1977 | Hunter | 182/187 |
| 4,129,198 | 12/1978 | Hunter | 182/187 |
| 4,727,961 | 3/1988 | Dawson | 182/187 |
| 4,840,252 | 6/1989 | Hucks | 182/187 |
| 5,297,656 | 3/1994 | Amacker | 182/187 |

*Primary Examiner*—Alvin C. Chin-Shue

[57] ABSTRACT

A foldable tree stand comprising a planar base section; securement means for coupling the base section to a tree, thereby placing it in an operable position; a pedestal pivotally coupled to the base section, the pedestal adapted to be pivotally positioned in proximity and essentially parallel with the base section in a stowed position, the pedestal further adapted to be pivotally positioned away from the base section and adjustably secured at a location essentially perpendicular thereto in an operable position; and a seat coupled to the pedestal.

1 Claim, 4 Drawing Sheets

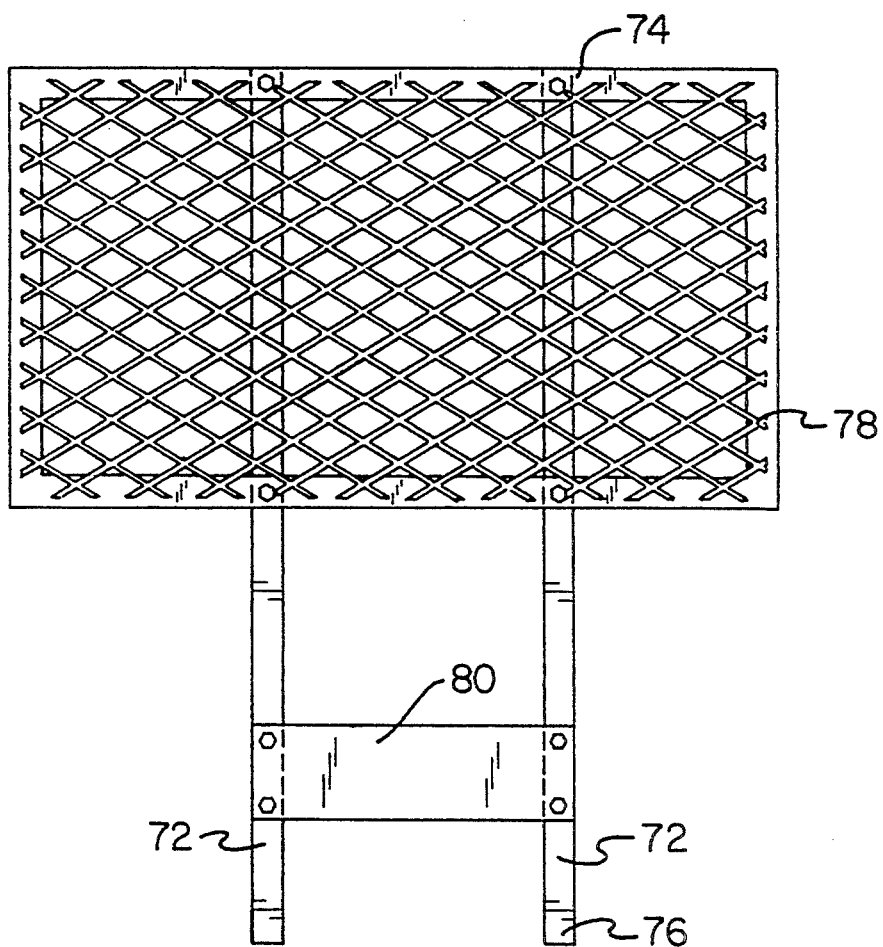
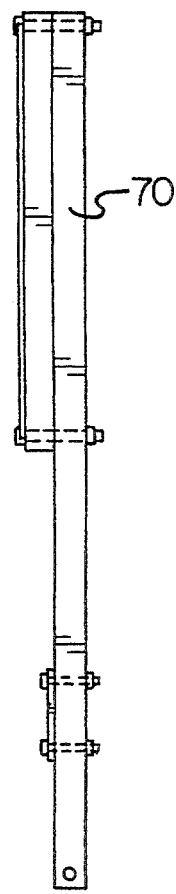
FIG. 4　　　　FIG. 5
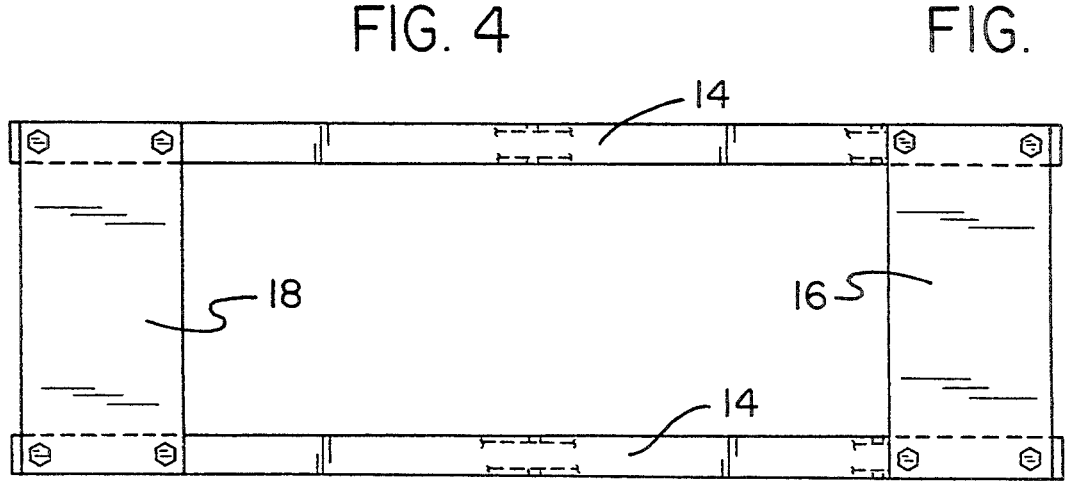
FIG. 6
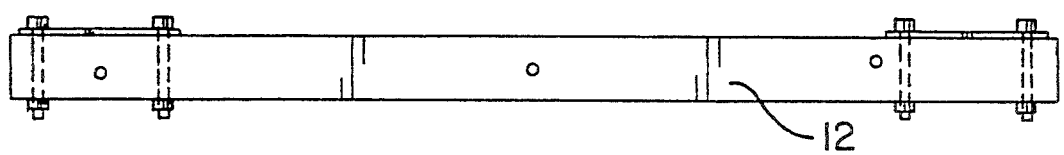
FIG. 7

FOLDABLE AND PORTABLE TREE STAND

BACKGROUND OF THE INVENTION

1. Field of the Invention

The present invention relates to a foldable and portable tree stand and more particularly pertains to providing a stationary support on which a user may sit when hunting and scouting game with a foldable and portable tree stand.

2. Description of the Prior Art

The use of tree stands is known in the prior art. More specifically, tree stands heretofore devised and utilized for the purpose of providing a stationary support for hunting are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,369,858 to Babb discloses a hunter's tree stand and seat. U.S. Pat. No. 5,009,285 to Ramsey discloses a combination backpack and tree stand. U.S. Pat. No. 5,016,732 to Dunn discloses a portable combination hunting and observation stand. U.S. Pat. No. 5,105,910 to Engstrom discloses a portable tree stand assembly for hunters. U.S. Pat. No. 5,234,076 to Louk et al. discloses a tree stand.

While these devices fulfill their respective, particular objective and requirements, the aforementioned patents do not describe a foldable and portable tree stand that may be readily secured to a tree or removed therefrom and readily folded and transported by a user from one location to another.

In this respect, the foldable and portable tree stand according to the present invention substantially departs from the conventional concepts and designs of the prior art, and in doing so provides an apparatus primarily developed for the purpose of providing a stationary support on which a user may sit when hunting and scouting game.

Therefore, it can be appreciated that there exists a continuing need for new and improved foldable and portable tree stand which can be used for providing a stationary support on which a user may sit when hunting and scouting game. In this regard, the present invention substantially fulfills this need.

SUMMARY OF THE INVENTION

In the view of the foregoing disadvantages inherent in the known types of tree stands now present in the prior art, the present invention provides an improved foldable and portable tree stand. As such, the general purpose of the present invention, which will be described subsequently in greater detail, is to provide a new and improved foldable and portable tree stand and method which has all the advantages of the prior art and none of the disadvantages.

To attain this, the present invention essentially comprises, in combination, a rigid base section having two spaced and parallel support rails each having a first end and a second end, a first cross beam coupled between the first ends, a second cross beam coupled between the second ends, with the coupling between the support rails and cross beams defining a rectangular configuration having a support surface and a coupling surface, and an elongated and rigid hook having a curved end removably secured around the first cross beam and a base end extended upwards therefrom. A T-shaped screw is disposed through the base end of the hook with the screw adapted for securing the base section to a tree such that its first cross beam is positioned above its second cross beam and its coupling surface is in contact with the tree, thereby placing the base section in an operable position.

A rigid pedestal is included and has two spaced and planarly aligned upper side rails each having a free end and a base end, the base ends thereof each pivotally coupled to a separate support rail of the base section at a location below the first cross beam, an inner cross beam coupled between the upper side rails near the base ends thereof, and an outer cross beam with a swivel plate secured thereupon coupled between the upper side rails near the free ends thereof. The pedestal is adapted to be pivotally positioned in proximity and essentially parallel with the support surface of the base section in a stowed position. The pedestal is further adapted to be pivotally positioned at a location perpendicular to the support surface of the base section in an operable position. A chair is included and has a padded seat and pivotable back rest with the seat pivotally coupled to the swivel plate of the pedestal, thereby enabling the chair to swivel The back rest is adapted to be pivotally positioned in proximity and essentially parallel with the seat in a stowed position. The back rest is further adapted to be pivotally extended positioned upwards from the seat in an operable position for sitting.

A rigid foot rest is included and has two spaced and parallel lower side rails each having a free end and a base end with the base ends thereof each pivotally coupled to a separate support rail of the base section at a location below the pedestal. A rectangular foot grate is coupled between the lower side rails at the free ends thereof, and a cross beam coupled between the lower side rails at a location between the foot grate and the base ends thereof. The foot rest is adapted to be pivotally positioned in proximity and essentially parallel with the coupling surface of the base section in a stowed position when the base section is de-coupled from a tree. The base section is further adapted to be pivotally positioned at a location perpendicular to the support surface of the base section in an operable position.

A pair of rigid, elongated, and spaced braces are included with each formed of two telescopically and adjustably mated segments. Each brace has one end pivotally coupled a separate upper side rail of the pedestal and the other end extended downwards therefrom and coupled to a separate support rail of the base section. The pair of braces are adapted to be positioned in a retracted configuration against the support surface of the base section when the pedestal is placed in a stowed position. The pair of braces are further adapted to be positioned in an extended orientation when the pedestal is placed in an operable position. A pair of spaced and flexible bracing cables are included. Each bracing cable has an upper end removably coupled to a support rail of the base section near a separate base end of the pedestal and a lower end extended through the foot grate and removably and adjustably coupled to a lower side rail of the foot rest. The pair of bracing cables are held taut when the foot rest is placed in an operable position and held loose when the foot rest is placed in a stowed position. A pair of adjustable cinch straps are included with one cinch strap adapted to be removably coupled between the support rails of the base section near the first cross beam thereof in a closed loop configuration about a tree and the other cinch strap adapted to be removably coupled between the support rails of the base section near the lower cross beam thereof in a closed loop configuration about the same tree. The same cinch straps are each removably coupled to a support rail of the base section and thereby define a pair of securement loops adapted for receiving the shoulders of a user therein for carrying the base section and the pedestal, chair, and foot rest in their stowed positions when de-coupled from a tree.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved foldable and portable tree stand which has all the advantages of the prior art tree stands and none of the disadvantages.

It is another object of the present invention to provide a new and improved foldable and portable tree stand which may be easily and efficiently manufactured and marketed.

It is a further object of the present invention to provide a new and improved foldable and portable tree stand which is of durable and reliable construction.

An even further object of the present invention is to provide a new and improved foldable and portable tree stand which is susceptible of a low cost of manufacture with regard to both materials and labor, and which accordingly is then susceptible of low prices of sale to the consuming public, thereby making such a foldable and portable tree stand economically available to the buying public.

Still yet another object of the present invention is to provide a new and improved foldable and portable tree stand which provides in the apparatuses and methods of the prior art some of the advantages thereof, while simultaneously overcoming some of the disadvantages normally associated therewith.

Even still another object of the present invention is to provide a new and improved foldable and portable tree stand for providing a stationary support on which a user may sit when hunting and scouting game.

Lastly, it is an object of the present invention to provide a new and improved foldable and portable tree stand comprising a planar base section; securement means for coupling the base section to a tree, thereby placing it in an operable position; a pedestal pivotally coupled to the base section, the pedestal adapted to be pivotally positioned in proximity and essentially parallel with the base section in a stowed position, the pedestal further adapted to be pivotally positioned away from the base section and adjustably secured at a location essentially perpendicular thereto in an operable position; and a seat coupled to the pedestal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a plan view of the foot rest of the present invention.

FIG. 5 is a side-elevational view of the foot rest shown in FIG. 4.

FIG. 6 is a plan view of the base section of the present invention.

FIG. 7 is a side-elevational view of the base section shown in FIG. 6.

The same reference numerals refer to the same parts through the various Figures.

DESCRIPTION OF THE PREFERRED EMBODIMENT

Figure 1:
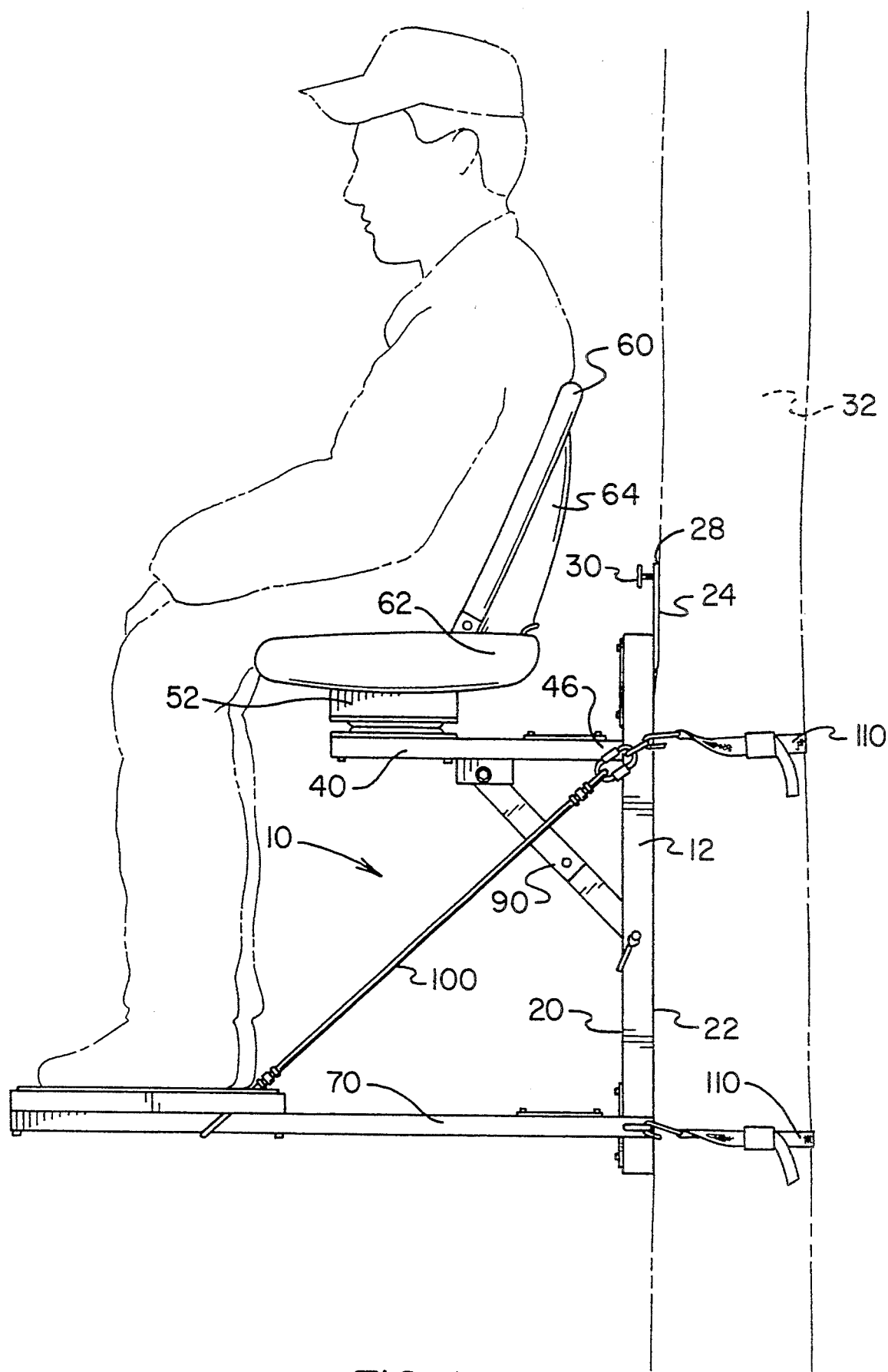
FIG. 1 is a side-elevational view of the preferred embodiment constructed in accordance with the principles of the present invention.
Figure 2:
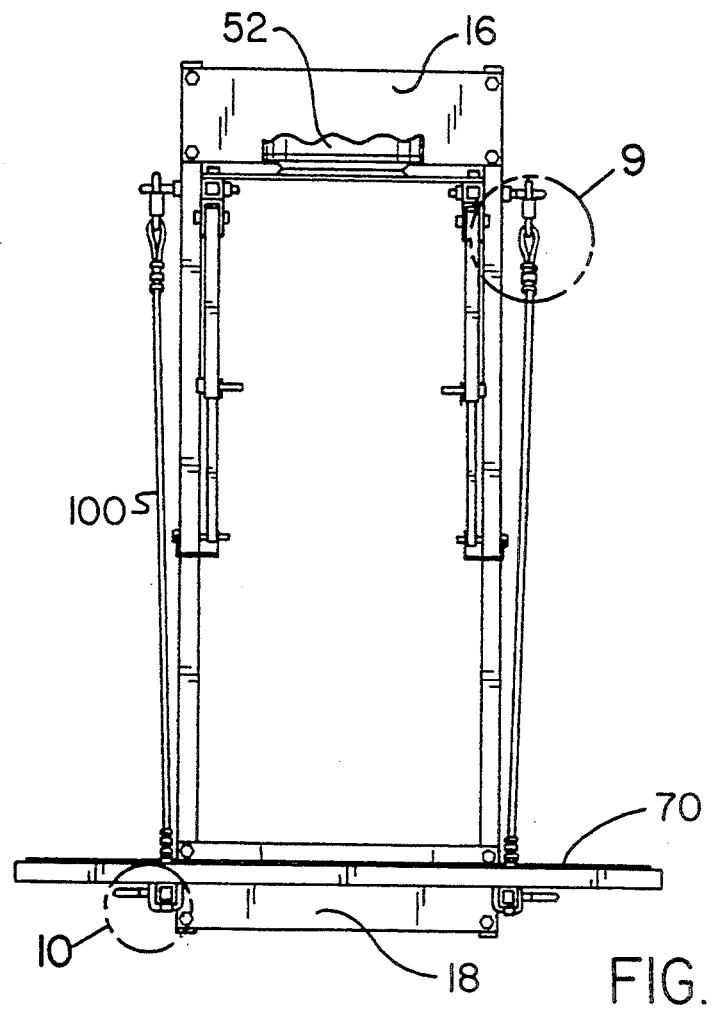
FIG. 2 is a front elevational view of the present invention with the chair removed.
Figure 3:
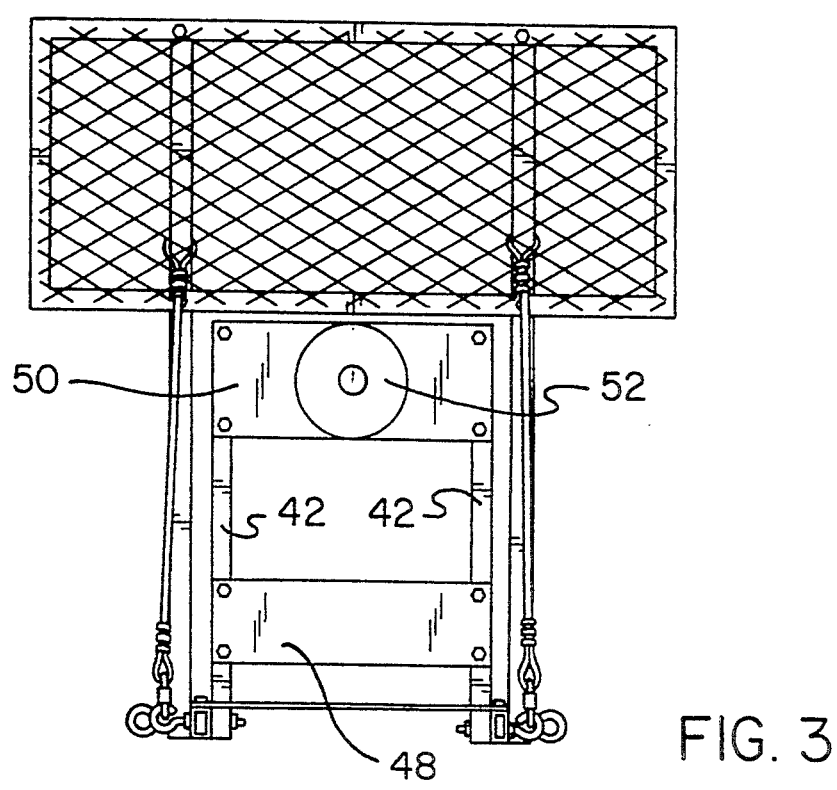
FIG. 3 is a plan view of the present invention with the chair removed.
Figure 8:
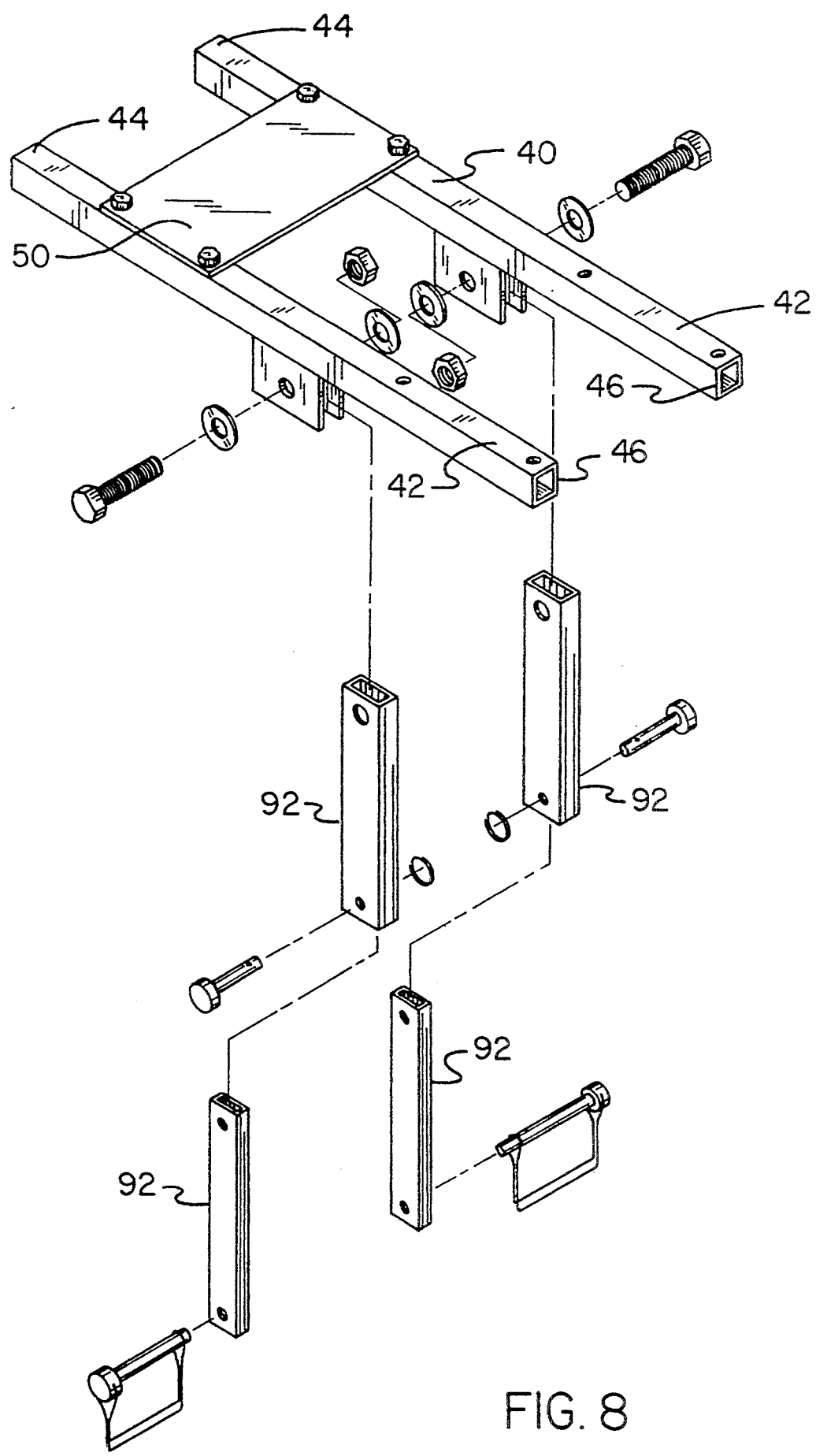
FIG. 8 is an exploded perspective view of the pedestal and associated braces.

With reference now to the drawings, and in particular, to FIG. 1 thereof, the preferred embodiment of the new and improved foldable and portable tree stand embodying the principles and concepts of the present invention and generally designated by the reference number 10 will be described.

Specifically, the present invention includes eight major components. The major components are the base section, screw, pedestal, chair, foot rest, braces, bracing cables, and cinch straps. These components are interrelated to provide the intended function.

More specifically, it will be noted in the various Figures that the first major component is the base section 12. The base section is rigid in structure. It has two spaced and parallel support rails 14. Each support rail has a first end and a second end. A first cross beam 16 is coupled between the first ends of the support rails. A second cross beam 18 is coupled between the second ends of the support rails. The coupling between the support rails and cross beams defines a rectangular configuration for the base section. This rectangular configuration has a support surface 20 and a coupling surface 22. The base section also has an elongated and rigid hook 24. The hook has a curved end. It is removably secured around the first cross beam. The hook also has a base end 28. It is extended upwards from the first cross beam when secured thereto.

The second major component is the screw 30. The screw is rigid and T-shaped in structure. One end of the screw is threaded. The other end has an elongated handle. The screw is disposed through the base end 28 of the hook. The screw is adapted for securing the base section 12 to a tree 32 in a position such that the first cross beam 16 of the base section is positioned above its second cross beam 18. Furthermore, the coupling is performed such that the coupling surface 22 of the base section is placed in contact against a tree. By securing the screw through the hook that is attached to the first cross beam, the base section is then placed in an operable position. The base section is thus essentially aligned in parallel with the central axis of a tree.

The third major component is the pedestal 40. The pedestal is rigid in structure. It has two spaced and aligned upper side rails 42. Each side rail has a free end 44 and a base end 46. The base end of each side rail is pivotally coupled to a separate support rail 14 of the base section at a location below the first cross beam 16. The pedestal also includes an inner cross beam 48. The inner cross beam is coupled between the upper side rails near the base ends thereof. The pedestal also includes an outer cross beam 50. The outer cross beam has a swivel plate 52 secured thereupon. The outer cross beam is coupled between the upper side rails near the free ends thereof. The cross beams provide rigidity to the pedestal. The pedestal is adapted to be pivotally positioned in proximity and essentially parallel with the support surface 20 of the base section 12. In this orientation, the pedestal is placed in a stowed position. The pedestal is further adapted to be pivotally positioned at a location perpendicular to the support surface of the base section. In this orientation, the pedestal is placed in an operable position for supporting the weight of a user.

The fourth major component is the chair 60. The chair has a padded seat 62 and a pivotal back rest 64 extended upwards therefrom. The seat is pivotally coupled to the swivel plate 50 of the pedestal. This coupling allows the chair to swivel about. A user may then adjust his viewing orientation when sitting on the chair without having to move the present invention. The back rest of the chair is adapted to be pivotally positioned in proximity and essentially parallel with the seat. In this orientation, the back rest is placed in a stowed position. The back rest is further adapted to be pivotally extended upwards from the seat. In this orientation, the back rest is placed in an operable position for supporting the back of a user sitting in the chair.

The fifth major component is the foot rest 70. The foot rest is rigid in structure. It has two spaced and parallel lower side rails 72. Each side rail has a free end 74 and a base end 76. Each base end of a side rail is pivotally coupled to a separate support rail 14 of the base section at a location below the pedestal 40. At this position, a user may comfortably rest his feet upon the foot rest when sitting in the chair. The foot rest includes a rectangular foot grate 78 coupled between the lower side rails at the free ends thereof. The grated configuration allows the weight of the foot rest to be decreased for transport provides a integral means for drainage, thus allowing a user to keep his feet dry. The foot rest also includes a cross beam 80. The cross beam is coupled between the lower side rails at a location between the foot grate and the base ends. The cross beam adds rigidity to the structure of the foot rest. The foot rest is adapted to be pivotally positioned in proximity and essentially parallel with the coupling surface 22 of the base section 12 in a stowed position when the base section is decoupled from a tree. The base section is also adapted to be pivotally positioned at a location perpendicular to the support surface 20 of the base section when coupled to a tree. In this orientation, the foot rest is placed in an operable position for providing a user a place to rest his feet.

The sixth major component is the braces 90. The present invention includes a pair of rigid, elongated, and spaced braces. Each brace is formed of two telescopically and adjustable mated segments 92. The mated segments are pivotally coupled with a retaining pin. Each brace has one end pivotally coupled to a separate upper side rail 42 of the pedestal. This coupling is performed with bolts secured with complimentary washers and threaded nuts. The other end of the brace is extended downwards and removably coupled to a separate support rail 14 of the base section. This removable coupling is performed with a retaining pin having an integral securement wire therearound to keep the pin from being inadvertently lost. The pair of braces are adapted to be positioned in a retracted configuration against the support surface 20 of the base section when the pedestal is placed in a stowed position. The braces are further adapted to be positioned in an extended orientation when the pedestal is placed in an operable position.

The seventh major component is the bracing cables 100. The present invention includes a pair of spaced and flexible bracing cables. Each bracing cable has an upper end removably coupled to a support rail 14 of the base section near a separate base end 46 of the pedestal. This removable coupling is performed with a D-ring having two removable segments. Each cable also has a lower end extended through the foot grate 78 and removably and adjustably coupled to a lower side rail 72 of the foot rest. This removable coupling is performed with a toggle bolt that can be tightened or loosened as desired in order to tighten or loosen the cable. The pair of bracing cables are held taut when the foot rest is placed in an operable position. The bracing cables are held loose when the foot rest is placed in a stowed position. They may be easily removed at this time.

The eighth major component is the cinch straps 110. The present invention includes a pair of adjustable cinch straps. One cinch strap is adapted to be removably coupled between the support rails 14 of the base section near the first cross beam 16 in a closed loop configuration about a tree 32. The other cinch strap is adapted to be removably coupled between the support rails of the base section near the lower cross beam 18 in a closed loop configuration about the same tree. The cinch straps in combination with the T-shaped screw hold the tree stand securely in place. Furthermore, the cinch straps may be removably coupled to a support rail of the base section when decoupled from a tree to define a pair of securement loops. These securement loops are adapted for receiving the shoulders of a user therein. In this configuration, carrying straps are used for carrying the base section and the pedestal, chair, and foot rest in their stowed positions. In this fashion, a user may move the tree stand easily from one location to another.

In the preferred embodiment, the length of the support rail of the base section is about 26 inches long and has a square cross-section of about 1 inch. The spacing between support rails of the base section is about $6\frac{1}{2}$ inches. The width of a cross beam of the base section as taken along an axis of a side rail is about 4 inches. The cross beams of the base section are each inwardly offset from the ends of the support rails by about $\frac{1}{4}$ inch. The ends of the braces are secured to a support rail at a location about $8\frac{1}{2}$ inches down from the first cross beam. The hook used for securing the base section to a tree is about 6 inches long. Each cross beam utilized in the present invention is formed of a $\frac{1}{8}$ inch thick plate.

The length of the upper side rails of the pedestal are about 17 inches long with a 1 inch square cross section. The width of the cross beam as measured along the central axis of an upper side rail is about 4 inches. The inner cross beam is offset about 3 inches from the base end of an upper rail. The distance between the upper side rails is about $4\frac{3}{8}$ inches.

The length of each segment of a brace is about $7\frac{1}{8}$ inches. One segment is formed with a $\frac{3}{4}$ inch cross section. The other segment is slidably received in the first section and formed with a $\frac{1}{8}$ inch cross section. Each brace is secured to the side rail of a base section with a 5/16 inch diameter x 3 inch long pin. The first segment is adjustable with respect to the second segment with a 5/16 inch diameter x $2\frac{1}{8}$ inch long pin.

Each bracing cable is about 29 inches long. Each bracing cable is coupled to a support rail of the base section with a locking D-ring with removable segments. A swivel plate is used to couple the seat of the chair to the pedestal. The swivel plate is about $6\frac{3}{8}$ inches square and secured carriage bolts each having a length of about $\frac{3}{8}$ inches. The distance between the pedestal and foot rest when extended is about $19\frac{1}{4}$ inches.

The foot grate of the foot rest is about 14 inches wide by about 24 inches long. The lower side rails of the foot rest have a length of about 34 inches. The spacing between the lower side rails of the foot rest is about $8\frac{5}{8}$ inches. The width of the cross beam of the foot rest as measured along the central axis of a lower side rail is about 3 inches.

The present invention is portable and can be folded up for easy storage and transport. It is made of rigid metal tubing with a 3/16 inch cable used for support of a comfortable foot rest. Steel is used for the tubing because of its strength and durability. An alternative model uses aluminum alloys for reduced weight and easy transport on long hunting trips. The stand can be set up at any height on the tree, with access to it achieved by screwed-in tree steps. Adjustable cinch straps are used to fasten the stand around the trunk of the tree.

The most attractive features of the present invention are a padded seat which swivels a full 360°, and the foot rest. The rotating seat makes visibility in all directions possible and the padding reduces unwanted noise. The foot rest enables the user to remain seated comfortably for long periods of time. It is made of expanded metal and can also serve as a sturdy platform for standing and holding additional equipment.

Packing the unit for transport is accomplished by removing several 5/16 inch diameter pins from the chair support sections and folding these sections inside each other and under the chair seat. The chair back pivots down onto the seat. The supporting cables on the footrest are unhooked from the D-rings and the collapsed chair module then folds down onto the bottom side of the footrest. Spring retainers and clips prevent the pins from falling out accidentally when the unit is in use.

In summary, the present invention is a portable folding tree stand. It is made of metal tubing with steel mesh foot decking supported by 3/16 inch steel cable. It has a 360° swivel seat which is padded and folds. It can be positioned at any desired height on a tree and held in position with locking cinch straps. You can use a series of screw in tree steps to get up the tree. To fold this design remove 5/16 inch pins, shorten seat supports by sliding one into the other and fold up under seat then fold seat down 90°. Unhook locking D-rings on ends of cables and fold foot rest down and around back 270°. The biggest advantage of this tree stand over the prior art of this type is the swivel seat for comfort and noise discipline. It can also handle more weight than prior art embodiments.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A foldable and portable tree stand for providing a stationary support on which a user may sit when hunting and scouting game comprising, in combination:

a rigid base section having two spaced and parallel support rails each having a first end and a second end, a first cross beam coupled between the first ends, a second cross beam coupled between the second ends, with the coupling between the support rails and cross beams defining a rectangular configuration having a support surface and a coupling surface, and an elongated and rigid hook with the hook having a curved end removably secured around the first cross beam and a base end extended upwards therefrom;

a T-shaped screw disposed through the base end of the hook with the screw adapted for securing the base section to a tree such that its first cross beam is positioned above its second cross beam and its coupling surface is in contact with the tree, thereby placing the base section in an operable position;

a rigid pedestal having two spaced and planarly aligned upper side rails each having a free end and a base end, the base ends thereof each pivotally coupled to a separate support rail of the base section at a location below the first cross beam, an inner cross beam coupled between the upper side rails near the base ends thereof, and an outer cross beam with a swivel plate secured thereupon coupled between the upper side rails near the free ends thereof, the pedestal adapted to be pivotally positioned in proximity and essentially parallel with the support surface of the base section in a stowed position, the pedestal further adapted to be pivotally positioned at a location perpendicular to the support surface of the base section in an operable position;

a chair having a padded seat and pivotable back rest with the seat pivotally coupled to the swivel plate of the pedestal, thereby enabling the chair to swivel, and the back rest adapted to be pivotally positioned in proximity and essentially parallel with the seat in a stowed position, the back rest further adapted to be pivotally extended positioned upwards from the seat in an operable position for sitting;

a rigid foot rest having two spaced and parallel lower side rails each having a free end and a base end with the base ends thereof each pivotally coupled to a separate support rail of the base section at a location below the pedestal, a rectangular foot grate coupled between the lower side rails at the free ends thereof, and a cross beam coupled between the lower side rails at a location between the foot grate and the base ends thereof, the foot rest adapted to be pivotally positioned in proximity and essentially parallel with the coupling surface of the base section in a stowed position when the base section is de-coupled from a tree, the foot rest further adapted to be pivotally positioned at a location perpendicular to the support surface of the base section in an operable position;

a pair of rigid, elongated, and spaced braces each formed of two telescopically and adjustably mated segments, each brace further having one end pivotally coupled a separate upper side rail of the pedestal and the other end extended downwards therefrom and coupled to a separate support rail of the base section, the pair of braces adapted to be positioned in a retracted configuration against the support surface of the base section when the pedestal is placed in a stowed position, the braces further adapted to be positioned in an extended orientation when the pedestal is placed in an operable position;

a pair of spaced and flexible bracing cables, each bracing cable having an upper end removably coupled to a support rail of the base section near a separate base end of the pedestal and a lower end extended through the foot grate and removably and adjustably coupled to a lower side rail of the foot rest, with the pair of bracing cables held taut when the foot rest is placed in an operable position and held loose when the foot rest is placed in a stowed position; and a pair of adjustable cinch straps with one cinch strap adapted to be removably coupled between the support rails of the base section near the first cross beam thereof in a closed loop configuration about a tree and the other cinch strap adapted to be removably coupled between the support rails of the base section near the lower cross beam thereof in a closed loop configuration about the same tree, the same cinch straps each removably coupled to a support rail of the base section and thereby defining a pair of securement loops adapted for receiving the shoulders of a user therein for carrying the base section and pedestal, chair, and foot rest in their stowed positions when de-coupled from a tree.

* * * * *